United States Patent
Kudo

(10) Patent No.: US 8,359,378 B2
(45) Date of Patent: Jan. 22, 2013

(54) NETWORK SYSTEM AND METHOD OF ADMINISTRATING NETWORKS

(75) Inventor: Yoshimitsu Kudo, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 12/094,740

(22) PCT Filed: Nov. 24, 2005

(86) PCT No.: PCT/JP2005/021578
§ 371 (c)(1),
(2), (4) Date: May 22, 2008

(87) PCT Pub. No.: WO2007/060721
PCT Pub. Date: May 31, 2007

(65) Prior Publication Data
US 2009/0164618 A1    Jun. 25, 2009

(51) Int. Cl.
*G06F 15/16* (2006.01)
*G06F 15/173* (2006.01)
*G06F 7/00* (2006.01)

(52) U.S. Cl. ........ 709/223; 709/202; 709/203; 709/212; 709/219; 709/224; 707/602

(58) Field of Classification Search .......... 709/202, 709/203, 219, 223, 224, 250
See application file for complete search history.

(56) References Cited

U.S. PATENT DOCUMENTS

| | | | | |
|---|---|---|---|---|
| 5,931,911 | A * | 8/1999 | Remy et al. | 709/223 |
| 7,484,213 | B2 * | 1/2009 | Mathew et al. | 718/100 |
| 2003/0041238 | A1 * | 2/2003 | French et al. | 713/153 |
| 2004/0061701 | A1 * | 4/2004 | Arquie et al. | 345/440 |

FOREIGN PATENT DOCUMENTS

| | | |
|---|---|---|
| JP | 08-255139 | 10/1996 |
| JP | 09-054611 | 2/1997 |
| JP | 2002-342182 | 11/2002 |
| JP | 2003-298655 | 10/2003 |
| JP | 2004-302525 | 10/2004 |
| JP | 2004-348640 | 12/2004 |
| JP | 2005-216066 | 8/2005 |

OTHER PUBLICATIONS

Quinlan, J.R., "C4.5: Programs for Machine Learning", translated by Y. Furukawa, Toppan Printing Co., May 25, 1995, p. 1-25.
http://h50146.www5.hp.com/partners/alliance/bea/sizing/, dated 2008.
http://h50146.www5.hp.com/products/servers/proliant/essentials/pmp_sh.html, dated 2008.
International Search Report, dated Jan. 11, 2006.

* cited by examiner

*Primary Examiner* — Ranodhi Serrao
*Assistant Examiner* — Farrukh Hussain

(57) ABSTRACT

A network system assists in selection of an optimum system structure for performance necessary for actual operations and a method of administrating networks. A server (222) is installed with software functioning as an SNMP agent to a monitor unit (240). An administrating server (24) has the monitor unit (240) of software functioning as an SNMP manager. A data collecting unit (300) collects structure and performance information from an infrastructure DB (26) of an administrating-assistance-subject network (2) and orders a system DB (32) to store such information. A rule generating unit (302) acquires the structure and performance information from the system DB (32), applies a learning technique of a decision tree or the like to generate sorting rules that sort the structure information in accordance with characteristic performance information at an operating time. An information extracting unit (304) acquires sorting rules from a rule memory unit (34) to provide a terminal device (36) with structure information of the other server (222) that satisfies necessary performance conditions for any one of the servers (222) at an operating time.

19 Claims, 15 Drawing Sheets

FIG. 3

| SERVER ID | SERVER NAME | OS TYPE | CPU NAME | FRE-QU-ENCY (MHz) | NUM... | MEM-ORY SIZE | PHYSI-CAL DRIVE TYPE | PHYSI-CAL DRIVE SIZE (MB) | ARRAY CONTRO-LLER NAME | FIRM-WARE VERSION | LOGICAL DRIVE SIZE (MB) | RAID TYPE | SYSTEM ROM VERSION | |
|---|---|---|---|---|---|---|---|---|---|---|---|---|---|---|
| 1 | SERVERA | OS-A | CPU-A | 3066 | 2 | 1048056 | Parallel SCSI | 65496 | CONTRO-LLER A | 2.56 | 34728 | 0+1 | P29-09/15/2004 | ... |
| 2 | SERVERA | OS-A | CPU-A | 3066 | 2 | 2096112 | Parallel SCSI | 65496 | CONTRO-LLER A | 2.56 | 34728 | 0+1 | P29-09/15/2004 | ... |
| 3 | SERVERA | OS-B | CPU-A | 2788 | 2 | 1048056 | Parallel SCSI | 65496 | CONTRO-LLER A | 2.56 | 34728 | 0+1 | P29-09/15/2004 | ... |
| 4 | SERVERA | OS-C | CPU-A | 3066 | 1 | 2096112 | Ultra 320 SCSI | 130992 | CONTRO-LLER A | 2.01 | 65496 | 0+1 | P29-09/15/2004 | ... |
| 5 | SERVERA | OS-D | CPU-A | 3066 | 1 | 2096112 | Parallel SCSI | 130992 | CONTRO-LLER A | 2.02 | 65496 | 0+1 | P29-09/15/2004 | ... |
| ... | ... | ... | ... | ... | ... | ... | ... | ... | ... | ... | ... | ... | ... | ... |
| 10 | SERVERB | OS-A | CPU-B | 3600 | 2 | 5240280 | Parallel SCSI | 65496 | CONTRO-LLER B | 1.04 | 34728 | 0+1 | P32-09/15/2005 | ... |
| 11 | SERVERB | OS-E | CPU-B | 3600 | 2 | 5240280 | Ultra 320 SCSI | 130992 | CONTRO-LLER B | 1.04 | 65496 | 0+1 | P32-09/15/2005 | ... |
| 12 | SERVERB | OS-F | CPU-B | 3600 | 2 | 5240280 | Ultra 320 SCSI | 130992 | CONTRO-LLER B | 1.04 | 65496 | 0+1 | P32-09/15/2005 | ... |
| ... | ... | ... | ... | ... | ... | ... | ... | ... | ... | ... | ... | ... | ... | ... |

| DATE/TIME | SERVER ID | AVAILABLE MEMORY SIZE (MB) | USED MEMORY SIZE (Byte) | PAGE/SEC | ... | USED DISK SIZE (%) | ACTIVE SESSION | PROCESSOR ACTIVITY RATIO (%) |
|---|---|---|---|---|---|---|---|---|
| 2005/9/15 10:00 | 2 | 3160 | 269549568 | 50.06152629 | ... | 2.769835136 | 1 | 1.028045017 |
| 2005/9/15 10:01 | 4 | 2709 | 405811200 | 6.756902412 | ... | 3.382208248 | 2 | 0 |
| 2005/9/15 10:02 | 2 | 2685 | 425283584 | 30.66325169 | ... | 21.76043271 | 3 | 1.564622235 |
| 2005/9/15 10:03 | 5 | 2677 | 448618496 | 100.9232377 | ... | 4.121481434 | 4 | 2.504588707 |
| 2005/9/15 10:04 | 2 | 2678 | 458051584 | 8.5990903 | ... | 7.095284694 | 5 | 0.676876123 |
| 2005/9/15 10:05 | 1 | 2673 | 467578880 | 80.79156479 | ... | 17.34461832 | 6 | 0.833537202 |
| 2005/9/15 10:06 | 4 | 2648 | 495931392 | 92.25629466 | ... | 35.77135658 | 8 | 2.419592649 |
| 2005/9/15 10:07 | 5 | 2640 | 520630272 | 149.2791101 | ... | 7.494899936 | 10 | 2.845670484 |
| 2005/9/15 10:08 | 2 | 2642 | 529485824 | 50.87441108 | ... | 3.166133648 | 10 | 1.408475926 |
| 2005/9/15 10:09 | 2 | 2636 | 536424448 | 18.26475883 | ... | 12.75840194 | 10 | 1.434607065 |

| INFRA-STRUC-TURE ID | SERVER ID | SERVER NAME | OS TYPE | CPU NAME | FRE-QUENCY (MHz) | NUMBER OF | MEMORY SIZE | PHYSICAL DRIVE TYPE | ... | FIRMWARE VERSION | LOGICAL DRIVE SIZE(MB) | RAID TYPE | SYSTEM | ... |
|---|---|---|---|---|---|---|---|---|---|---|---|---|---|---|
| 1 | 1 | SERVER A | OS-A | CPU-A | 3066 | 2 | 1048056 | Parallel SCSI | ... | 2.56 | 34728 | 0+1 | P29-09/15/2004 | ... |
| 1 | 2 | SERVER A | OS-A | CPU-A | 3066 | 2 | 2096112 | Parallel SCSI | ... | 2.56 | 34728 | 0+1 | P29-09/15/2004 | ... |
| 1 | 3 | SERVER A | OS-B | CPU-A | 2788 | 2 | 1048056 | Parallel SCSI | ... | 2.56 | 34728 | 0+1 | P29-09/15/2004 | ... |
| 1 | 4 | SERVER A | OS-C | CPU-A | 3066 | 1 | 2096112 | Ultra 320 SCSI | ... | 2.01 | 65496 | 0+1 | P29-09/15/2004 | ... |
| 1 | 5 | SERVER A | OS-D | CPU-A | 3066 | 1 | 2096112 | Parallel SCSI | ... | 2.02 | 65496 | 0+1 | P29-09/15/2004 | ... |
| ... | ... | ... | ... | ... | ... | ... | ... | ... | ... | ... | ... | ... | ... | ... |
| 1 | 10 | SERVER B | OS-A | CPU-B | 3600 | 2 | 5240280 | Parallel SCSI | ... | 1.04 | 34728 | 0+1 | P32-09/15/2005 | ... |
| 1 | 11 | SERVER B | OS-E | CPU-B | 3600 | 2 | 5240280 | Ultra 320 SCSI | ... | 1.04 | 65496 | 0+1 | P32-09/15/2005 | ... |
| 1 | 12 | SERVER B | OS-F | CPU-B | 3600 | 2 | 5240280 | Ultra 320 SCSI | ... | 1.04 | 65496 | 0+1 | P32-09/15/2005 | ... |
| ... | ... | ... | ... | ... | ... | ... | ... | ... | ... | ... | ... | ... | ... | ... |

| DATE/TIME | INFRASTRUCTURE ID | SERVER ID | AVAILABLE MEMORY SIZE | USED MEMORY SIZE (Byte) | PAGE/SEC | ... | USED DISK SIZE (%) | ACTIVE SESSION | PROCESSOR ACTIVITY RATIO (%) |
|---|---|---|---|---|---|---|---|---|---|
| 2005/9/15 10:00 | 1 | 2 | 3160 | 269549568 | 50.06152629 | ... | 2.769835136 | 1 | 1.028045017 |
| 2005/9/15 10:01 | 1 | 4 | 2709 | 405811200 | 6.756902412 | ... | 3.382208248 | 2 | 0 |
| 2005/9/15 10:02 | 1 | 2 | 2685 | 425283584 | 30.66325169 | ... | 21.76043271 | 3 | 1.564622235 |
| 2005/9/15 10:03 | 1 | 5 | 2677 | 448618496 | 100.9232377 | ... | 4.121481434 | 4 | 2.504588707 |
| 2005/9/15 10:04 | 1 | 2 | 2678 | 458051584 | 8.5990903 | ... | 7.095284694 | 5 | 0.676876123 |
| 2005/9/15 10:05 | 1 | 1 | 2673 | 467578880 | 80.79156479 | ... | 17.34461832 | 6 | 0.833537202 |
| 2005/9/15 10:06 | 1 | 4 | 2648 | 495931392 | 92.25629466 | ... | 35.77135658 | 8 | 2.419592649 |
| 2005/9/15 10:07 | 1 | 5 | 2640 | 520630272 | 149.2791101 | ... | 7.494899936 | 10 | 2.845670484 |
| 2005/9/15 10:08 | 1 | 2 | 2642 | 529485824 | 50.87441108 | ... | 3.166133648 | 10 | 1.408475926 |
| 2005/9/15 10:09 | 1 | 2 | 2636 | 536424448 | 18.26475883 | ... | 12.75840194 | 10 | 1.434607065 |

| AVAILABLE MEMORY SIZE (MB) | USED MEMORY SIZE (Byte) | PAGE/SEC | ... | USED DISK SIZE (%) | ACTIVE SESSION | PROCESSOR ACTIVITY RATIO (%) |
|---|---|---|---|---|---|---|
| 3160 | 269549568 | 50.06152629 | ... | 2.769835136 | 1 | CLASS:0 - 70 |
| 2709 | 405811200 | 6.756902412 | ... | 3.382208248 | 2 | CLASS:0 - 70 |
| 219 | 4791857152 | 8.333249037 | ... | 20.64483338 | 3 | CLASS:70 - 100 |
| 224 | 4786237440 | 5.13243125 | ... | 18.93658636 | 4 | CLASS:70 - 100 |
| 235 | 4753903616 | 8.932674308 | ... | 23.35636771 | 5 | CLASS:70 - 100 |
| 2673 | 4675788880 | 80.79156479 | ... | 17.34461832 | 6 | CLASS:0 - 70 |
| 2648 | 495931392 | 92.25629466 | ... | 35.77135658 | 8 | CLASS:0 - 70 |
| 183 | 4538494976 | 5.399230944 | ... | 17.53561032 | 10 | CLASS:70 - 100 |
| 174 | 4523937792 | 8.199374669 | ... | 16.04461056 | 10 | CLASS:70 - 100 |
| ... | ... | ... | ... | ... | ... | ... |

S30

S50

NETWORK SYSTEM AND METHOD OF ADMINISTRATING NETWORKS

PRIORITY CLAIM

The present invention is National Stage Commencement Application under 35 U.S.C. 371 of Japanese PCT Application Serial No. PCT/JP2005/021578, filed on Nov. 24, 2005, the disclosure of which is hereby incorporated by reference in its entirety.

TECHNICAL FIELD

The present invention relates to a network system including a plurality of agent nodes having an agent function and one or more manager nodes having a manager function, and to a method of administrating networks.

BACKGROUND ART

For example, JP 2005-216066 discloses a method of detecting a fault in an environment upon execution by obtaining a feature vector indicating an activity balance of nodes with respect to a system in which computers are active in association with each other.

JP 2004-302525 discloses a method of evaluating a performance balance of devices constituting a computer system by causing the computer system to process a test application.

Meanwhile, a simple sizing tool for calculating an estimated resource for servers based on an access amount is known (refer to Non-patent Document 1; h50146.www5.hp.com/partners/alliance/bea/sizing).

Software for detecting a bottleneck of hardware on a server is also known (refer to Non-patent Document 2: h50146.www5.hp.com/products/servers/proliant/essentials/pmp_sh.html).

Further, Non-patent Document 3; bruch.sfc.keio.ac.jp/course/HIP0I/hi2001-6.ppt discloses a method of handling an unknown environment by an agent using a learning technique of a decision tree, a neural network, or the like.

However, none of these patent documents and non-patent documents disclose a method of assisting in selection of an optimum system structure for performance necessary for actually operating servers and the like without using a test application.

DISCLOSURE OF THE INVENTION

Problem to be Solved by the Invention

The present invention has been made against the above-mentioned backdrop, and an object thereof is to provide a system administrator upon building an IT infrastructure environment with a network system which can assist in selection of an optimum system structure for performance necessary for actual operations and a method of administrating networks.

Means for Solving the Problem

Network System

In order to attain the above object, according to the present invention, a network system including one or more manager nodes having a manager function for performing at least structure management and operating-time performance management on a plurality of agent nodes having an agent function includes: storage means for storing structure information and operating-time performance information on each of the agent nodes; rule generating means for generating sorting rules for sorting the structure information stored in the storage means based on characteristic performance information at an operating time; extracting means for extracting structure information on another one of the agent nodes that satisfies necessary performance conditions at an operating time for at least one of the agent nodes, based on the sorting rules generated by the rule generating means, from the storage means; and output means for outputting the structure information extracted by the extracting means.

Preferably, the extracting means further extracts information indicating the sorting rules being a basis for extracting the structure information on the another one of the agent nodes, and the output means further outputs the information indicating the sorting rules extracted by the extracting means.

Further, according to the present invention, a network system including one or more manager nodes having a manager function for performing at least structure management and operating-time performance management on a plurality of agent nodes having an agent function includes: storage means for storing structure information and operating-time performance information on each of the agent nodes; rule generating means for generating sorting rules for sorting the structure information stored in the storage means based on characteristic performance information at an operating time; extracting means for extracting performance information to be a bottleneck in terms of necessary performance conditions at an operating time for at least one of the agent nodes, based on the sorting rules generated by the rule generating means, from the storage means for each of the agent nodes; and output means for outputting the performance information extracted by the extracting means.

Preferably, the extracting means further extracts information indicating the sorting rules being a basis for extracting the performance information to be the bottleneck for each of the agent nodes, and the output means further outputs the information indicating the sorting rules extracted by the extracting means.

In addition, preferably, the network system further includes structure information input means for receiving an input indicating the structure information corresponding to at least one of the agent nodes, in which the extracting means extracts information corresponding to the input received by the structure information input means from the storage means.

In addition, preferably, the network system further includes performance condition input means for receiving an input indicating the necessary performance conditions at an operating time for at least one of the agent nodes, in which the extracting means extracts information corresponding to the input received by the performance condition input means from the storage means.

In addition, preferably, the rule generating means generates the sorting rules while learning.

Method of Administrating Networks

Further, according to the present invention, a method of administrating networks each of which includes one or more manager nodes having a manager function for performing at least structure management and operating-time performance management on a plurality of agent nodes having an agent function includes: storing structure information and operating-time performance information on each of the agent nodes in storage means; generating sorting rules for sorting the stored structure information based on characteristic performance information at an operating time; extracting structure information on another one of the agent nodes that satisfies necessary performance conditions at an operating time for at least one of the agent nodes, based on the generated sorting rules, from the storage means; and outputting the extracted structure information.

Further, according to the present invention, a method of administrating networks each of which includes one or more manager nodes having a manager function for performing at least structure management and operating-time performance management on a plurality of agent nodes having an agent function includes: storing structure information and operating-time performance information on each of the agent nodes in storage means; generating sorting rules for sorting the stored structure information based on characteristic performance information at an operating time; extracting performance information to be a bottleneck in terms of necessary performance conditions at an operating time for at least one of the agent nodes, based on the generated sorting rules, from the storage means for each of the agent nodes; and outputting the extracted performance information.

Effect of the Invention

According to the present invention, it is possible to assist a system administrator upon building an IT infrastructure environment in selection of an optimum system structure for performance necessary for actual operations.

BRIEF DESCRIPTION OF THE DRAWINGS

FIG. 3 is a table exemplifying structure information stored by an infrastructure DB.

FIG. 4 is a table exemplifying performance information stored by the infrastructure DB.

FIG. 5 is a table exemplifying structure information containing respective structure information items on an infrastructure ID basis stored by a system DB.

FIG. 6 is a table exemplifying performance information containing respective performance information items on an infrastructure ID basis stored by the system DB.

FIG. 7 is a table showing a processing result obtained by discretizing an attribute value of an attribute designated as a class of a decision tree in the performance information acquired by a rule generating unit from a system DB (32).

BEST MODE FOR CARRYING OUT THE INVENTION

Network System 1

Hereinafter, description will be made of an embodiment of the present invention.

Figure 1:
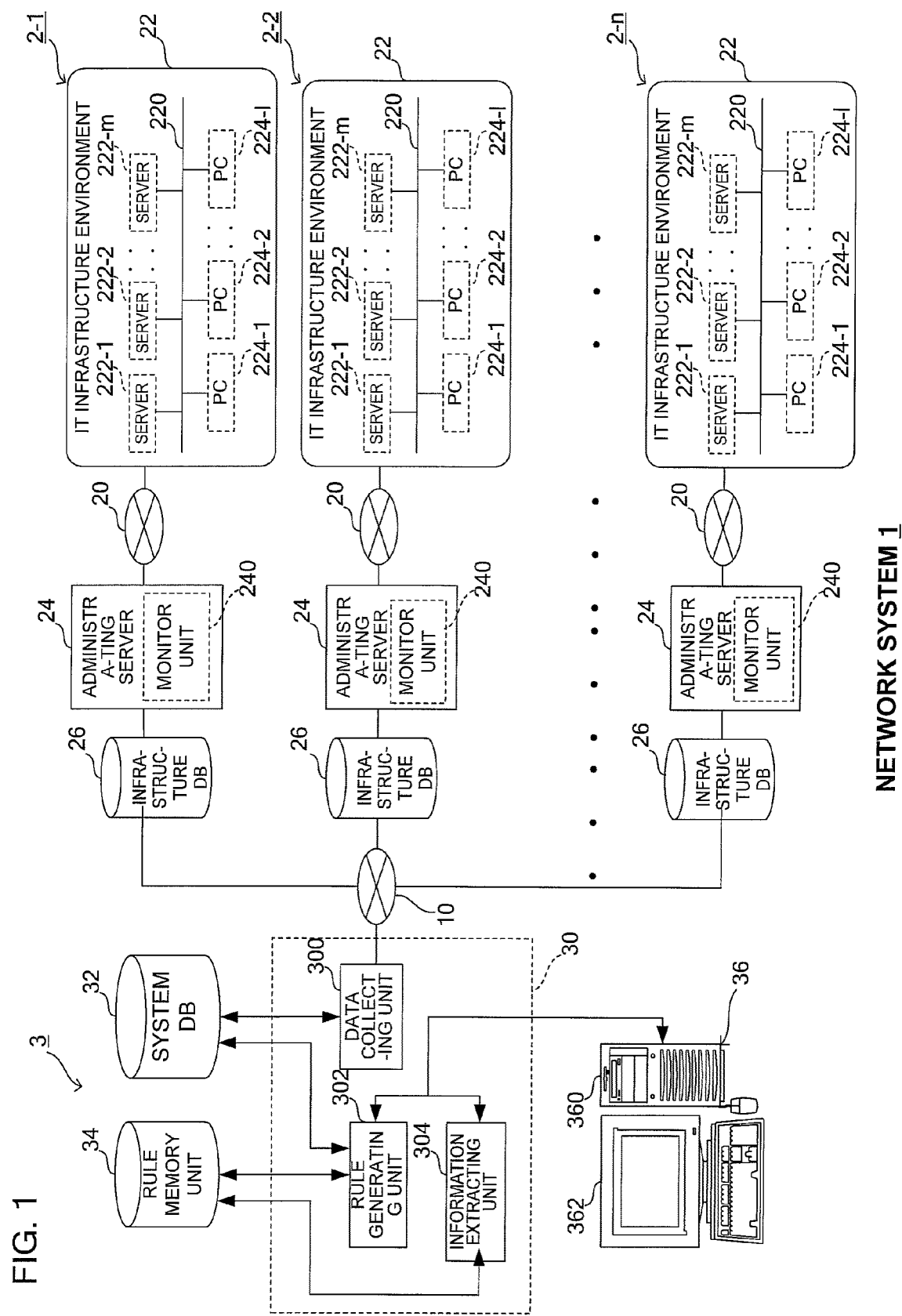
FIG. 1 is a diagram exemplifying a structure of a network system according to the present invention.

FIG. 1 is a diagram exemplifying a structure of a network system 1 according to the present invention.

As shown in FIG. 1, the network system 1 has a structure in which administrating-assistance-subject networks 2-1 to 2-n (n is an integer) and an administrating-assistance system 3 are connected to one another via a network 10 using, for example, a TCP/IP or a UDP.

In the following description, when any of such a plurality of components as the administrating-assistance-subject networks 2-1 to 2-n is indicated without being specified, it may be referred to simply as "administrating-assistance-subject network 2" or the like.

Administrating-assistance-subject networks 2-1 to 2-n

The administrating-assistance-subject networks 2-1 to 2-n each include an IT infrastructure environment 22, an administrating server 24, and an infrastructure database (infrastructure DB) 26 such that the IT infrastructure environment 22 is connected with the administrating server 24 and the infrastructure DB 26 via a network 20.

The IT infrastructure environment 22 includes servers 222-1 to 222-1 (m is an integer) and personal computers (PCs; clients) 224-l to 224-l (l is an integer), which are connected to one another via a network 220, and is subjected to structure management, performance management, fault management, and the like which are performed by the administrating server 24 by using, for example, a simple network management protocol (SNMP).

Note that the administrating-assistance-subject networks 2-1 to 2-n may be different from each other in the number of the servers 222 and PCs 224.

Therefore, in order to distinguish the respective networks, the administrating-assistance-subject networks 2-1 to 2-n are assigned with unique IDs (infrastructure IDs), for example, 1 to n.

Each of the servers 222-1 to 222-m includes software (not shown) that functions as an SNMP agent with respect to a monitor unit 240 described later, provides a service in response to access from the PCs 224-1 to 224-l, and transmits structure information 260 (refer to FIG. 3) and performance information 264 (refer to FIG. 4) that are described later and the like to the administrating server 24 from a management information base (MIB) (not shown).

The administrating server 24 includes the monitor unit 240 for software that functions as an SNMP manager, acquires the structure information 260 and performance information 264 of its own, the servers 222-1 to 222-m, or the like (within the administrating-assistance-subject network 2) at a predetermined timing, and outputs the information to the infrastructure DB 26.

The administrating server 24 is also assigned with a unique server ID that indicates itself.

The infrastructure DB 26 stores the structure information 260, the performance information 264, or the like that are inputted from the administrating server 24, and outputs the structure information 260, the performance information 264, or the like in response to access from an administrating-assistance server 30 described later.

Note that the infrastructure DB 26 may be a storage connected to the administrating server 24, may be included in the administrating server 24, or may be an independent server.

The administrating-assistance system 3 is constituted of the administrating-assistance server 30, a system database (system DB) 32, a rule memory unit 34, and a terminal device 36.

The administrating-assistance server 30 includes, for example, a data collecting unit 300, a rule generating unit 302, and an information extracting unit 304.

The data collecting unit 300 collects the structure information 260, the performance information 264, or the like from the respective infrastructure DBs 26 of the administrating-assistance-subject networks 2-1 to 2-n via the network 10, and stores the information in the system DB 32.

The rule generating unit 302 receives inputs of settings and the like made by an administrator via the terminal device 36, and acquires the structure information and performance information on the respective administrating-assistance-subject networks 2-1 to 2-n from the system DB 32. The rule generating unit 302 applies a learning technique of, for example, a neural network or a decision tree used for data mining to generate sorting rules for sorting the structure information items in accordance with characteristic performance information at an operating time, and stores the generated sorting rules in the rule memory unit 34.

The information extracting unit 304 acquires the sorting rules from the rule memory unit 34 in accordance with the settings and the like inputted by the administrator via the terminal device 36, and outputs to the terminal device 36 the structure information 260 on the other server 222 which satisfies necessary performance conditions for any one of the servers 222 at an operating time, or the structure information 260 and the performance information 264, or one of those, which are to be a bottleneck against the necessary performance conditions for any one of the servers 222 at an operating time, for example.

The terminal device 36 is, for example, a personal computer (PC) including a computer main body 360 and an input/output device (UI device) 362 for displaying a console. The terminal device 36 receives inputs of settings and the like made by the administrator, and outputs the inputted information to the administrating-assistance server 30, while displaying information inputted from the administrating-assistance server 30.

Hardware

Figure 2:
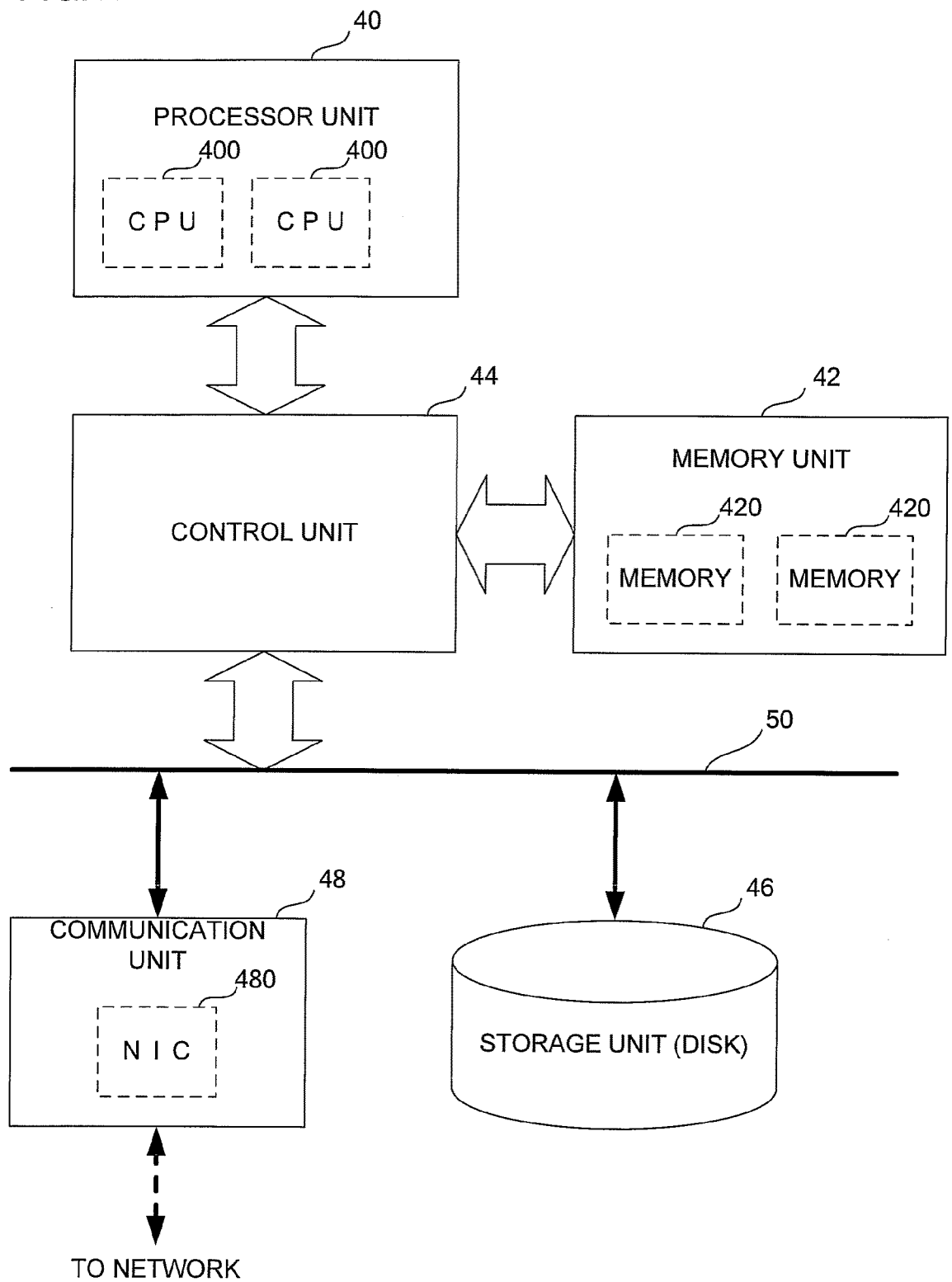
FIG. 2 is a block diagram showing an overview of a hardware structure of a server shown in FIG. 1.

FIG. 2 is a block diagram showing an overview of a hardware structure of the server 222 shown in FIG. 1.

As shown in FIG. 2, the server 222 includes a processor unit 40, a memory unit 42, a control unit 44, a storage unit 46, a communication unit 48, and a system bus 50.

The processor unit 40 includes, for example, two CPUs 400 capable of multiprocessing, performs operation processing, and constitutes a CPU subsystem for controlling each component of the server 222.

The memory unit 42 includes, for example, two memories 420, and constitutes a memory subsystem having a predetermined memory bandwidth.

The memory unit 42 may further include a ROM (not shown) or the like that stores a program for operating the server 222.

The control unit 44 is, for example, located among the processor unit 40, the memory unit 42, and the system bus 50, and controls data communications within the server 222 so as to improve efficiency in data communications performed among the processor unit 40, the memory unit 42, and system bus 50.

The storage unit 46 is, for example, a storage of RAID 0+1, and constitutes a storage subsystem connected to the control unit 44 via the system bus 50.

The communication unit 48 includes a network interface card (NIC) 480, and constitutes a NIC subsystem for connecting each component of the server 222 with an external network via the system bus 50 and the like.

The system bus 50 is, for example, a PCI (PCI-X) bus, and constitutes a host bus subsystem according to control of the control unit 44.

Note that the servers 222 may differ from each other in specifications such as the number and performance capabilities of the CPUs 400, storage capacities of the memory unit 42 and storage unit 46, firmware, and communication speed, and a change in the structure such as an expansion of the CPUs 400 is allowed.

Therefore, in order to distinguish the respective servers, the servers 222-1 to 222-m are assigned with unique IDs (server IDs), for example, 1 to m.

The administrating server 24 and the administrating-assistance server 30, for example, have substantially the same hardware structures as the server 222, and are each provided with settings such as a predetermined number of CPUs 400 and performance capabilities thereof.

Infrastructure DB 26

Next, detailed description will be made of the structure information and performance information that are stored by the infrastructure DB 26.

FIG. 3 is a table exemplifying the structure information 260 stored by the infrastructure DB 26.

As shown in FIG. 3, the infrastructure DB 26 stores the respective structure information items on the servers 222-1 to 222-m and the administrating server 24 that constitute the administrating-assistance-subject network 2 as the structure information 260 on a server ID basis.

The structure information 260 contains, for example, a unique server ID, a server name for identifying a model name, an installed OS type, an installed CPU name, a frequency (MHz) of the CPU 400, the number of installed CPUs, an installed memory size, a physical drive type for indicating the type of method of connecting a physical drive, a physical drive size for indicating a capacity of the physical drive, a RAID-purpose array controller name, a RAID-purpose firmware version, a set logical drive size, a provided RAID type, and a system ROM version for indicating the version of software for operation.

FIG. 4 is a table exemplifying the performance information 264 stored by the infrastructure DB.

As shown in FIG. 4, the infrastructure DB 26 stores the respective performance information items at an operating time on the servers 222-1 to 222-m and the administrating server 24 that constitute the administrating-assistance-subject network 2 as the performance information 264 on a server ID basis, for example, at a predetermined date and time (at predetermined intervals).

The performance information 264 contains performance parameters of each of the servers 222-1 to 222-m and the administrating server 24 at a predetermined date and time while the administrating-assistance-subject network 2 is operating, the performance parameters including an available memory size (MB), a used memory size (Byte), the number of transferred pages per second (page/sec), a used disk size (%), the number of connected users (active session count), and a processor activity ratio (%).

Note that the server ID shown in FIG. 4 is the above-mentioned unique ID for identifying any one of the servers 222-1 to 222-*m* and the administrating server 24 in association with the server ID shown in FIG. 3.

The performance information 264 may further contain respective monitor results by monitoring at the above-mentioned CPU subsystem (processor unit 40) an average processor activity ratio (%), a maximum processor activity ratio (%), a processor busy ratio (%) to be measured for each logical processor, a context switch count per second, an interrupt count per second, and the like, by monitoring at the memory subsystem (memory unit 42) the number of read pages per second, a page input count per second, a page fault count per second, and a hard page fault ratio (%), by monitoring at the NIC subsystem (communication unit 48) a network transfer amount (MByte/sec), a transmission amount (MBit) per second, and a reception amount (MBit) per second, by monitoring at the storage subsystem (storage unit 46) a storage transfer count per second and a storage transfer amount (MByte) per second, and monitoring at the host bus subsystem (such as the system bus 50) a host bus transfer amount (MByte) per second.

System DB 32

The system DB 32 stores the structure information 260 and the performance information 264 on the respective administrating-assistance-subject networks 2-1 to 2-*n*, which are collected by the data collecting unit 300 as described above.

FIG. 5 is a table exemplifying structure information 320 containing the respective structure information 260 items on an infrastructure ID basis stored by the system DB 32.

FIG. 6 is a table exemplifying performance information 324 containing the respective performance information 264 items on an infrastructure ID basis stored by the system DB 32.

As shown in FIGS. 5 and 6, the system DB 32 stores the structure information 260 and the performance information 264 on the respective administrating-assistance-subject networks 2-1 to 2-*n* as the structure information 320 and the performance information 324 in which the information items are sorted by infrastructure ID.

Rule Generating Unit 302

Next, detailed description will be made of a processing performed by the rule generating unit 302. The rule generating unit 302 adopts a decision tree generation algorithm that is generally used for a data mining technique.

FIG. 7 is a table showing a processing result obtained by discretizing (binarizing) an attribute value (referred to as a "class") of an attribute (referred to as a "target attribute") designated as a class of a decision tree in the performance information 324 acquired by the rule generating unit 302 from the system DB 32. With regard to the setting of the target attributes and the conversion of the classes into discrete values, the administrator performs settings in advance with respect to the rule generating unit 302, or the administrator performs inputs via the terminal device 36.

For example, in a case where the target attribute is set to be the processor activity ratio and two classes (class: 0-70 and class: 70-100) are set by using whether the processor activity ratio is less than 70% or not as a condition (boundary value) for discretization, upon reception of an input such as a predetermined inquiry (described later with reference to FIGS. 13 and 15) made by the administrator via the terminal device 36, the rule generating unit 302 acquires the structure information 320 and the performance information 324 from the system DB 32, and subjects the performance information 324 to a discretization (binarization) processing for sorting the processor activity ratios by class into class: 0-70 and class: 70-100 as shown in FIG. 7.

The rule generating unit 302 further uses the structure information 320 and the performance information 324 to subject the performance information 324 to the discretization processing for every predetermined structure information items, that is, on a server ID basis, on a basis of the combination of the server ID and the OS, on a basis of the combination of the server name and the OS, on a basis of the combination of the name, frequency, and count of CPUs and the memory size, or the like.

The rule generating unit 302 then consolidates data in accordance with the predetermined structure condition set by the administrator, and performs a learning so that the class becomes a conclusion part of rules, to thereby generate a decision tree.

The discretization performed by the rule generating unit 302 is not limited to the binarization, and may be, for example, ternarization or quaternarization.

Herein, the administrator sets, for example, the boundary value of the processor activity ratio to 70% in order to judge whether or not the server 222 is in such an operation situation that necessitates consideration of an expansion of the CPUs 400.

Further, the condition used when the rule generating unit 302 subjects the performance information 324 to the discretization is not limited to the boundary value of the processor activity ratio, and may be another performance parameter such as, for example, the number of transferred pages per second.

Figure 8:
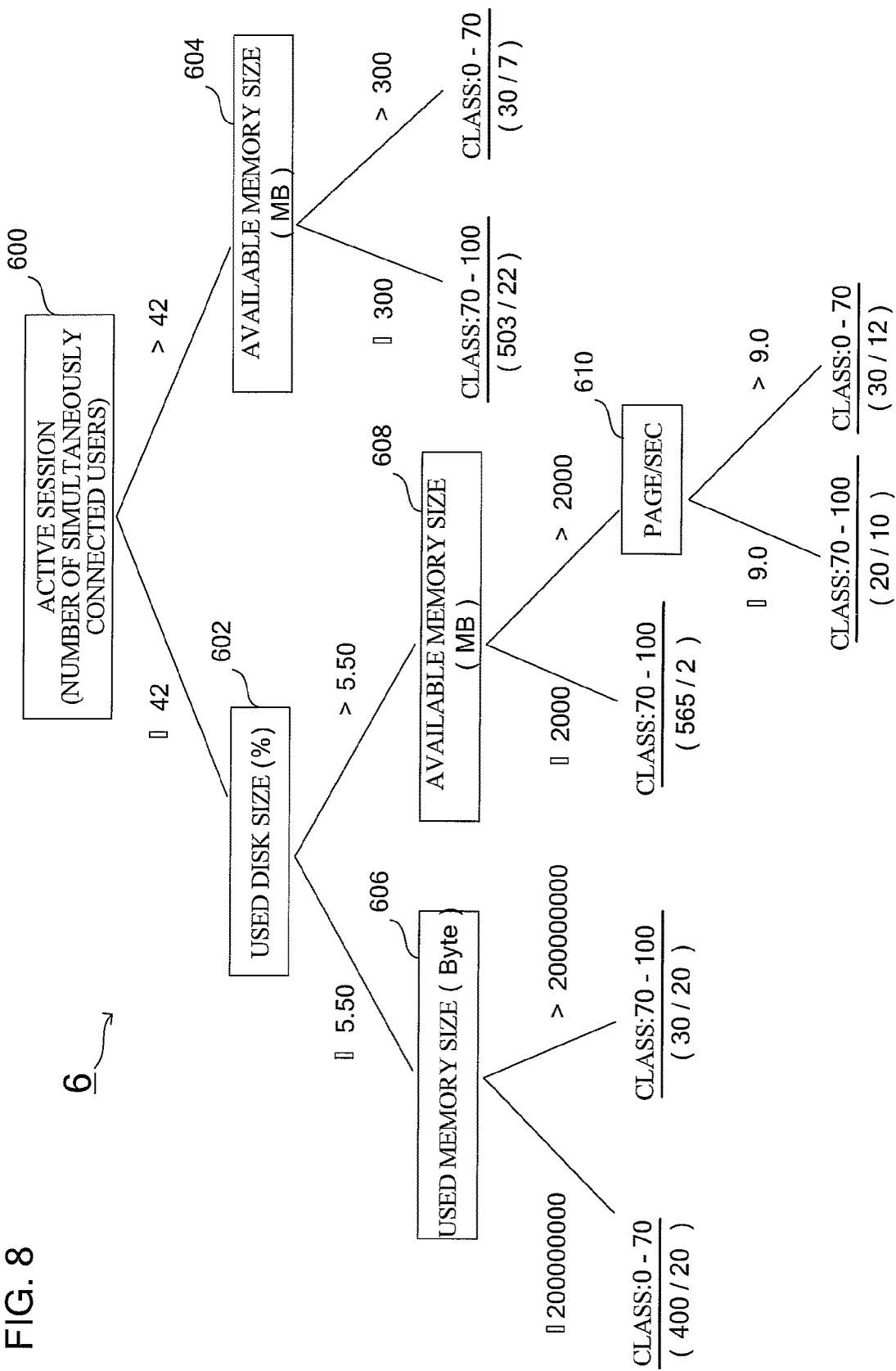
FIG. 8 is an example of a decision tree generated by the rule generating unit in terms of a predetermined structure condition (structure information) on a server set by an administrator.

FIG. 8 is an example of the decision tree generated by the rule generating unit 302 in terms of a predetermined structure condition (structure information) on the server 222 set by the administrator.

As shown in FIG. 8, in a decision tree 6 generated by the rule generating unit 302, a node 600 to be a root has the condition formed of an attribute paired with an attribute value (hereinafter, referred to as an "attribute condition") set for the active session (the number of simultaneously connected users).

For example, the rule generating unit 302 divides the node 600 into a branch with the number of simultaneously connected users being 42 or less and a branch with the number of simultaneously connected users being larger than 42 in terms of the performance information.

Further, in order to locate any one of the binarized results (class: 0-70 or class: 70-100) at each leaf as a conclusion part, the rule generating unit 302 divides, for example, a node 602 having the attribute condition set for the used disk size, a node 604 having the attribute condition set for the available memory size, a node 606 having the attribute condition set for the used memory size, a node 608 having the attribute condition set for the available memory size, a node 610 having the attribute condition set for the number of transferred pages per second, into more branches.

Note that the rule generating unit 302 uses the structure information 320 and the performance information 324 to perform a plurality of learnings for every predetermined structure information items, that is, on a server ID basis, on a basis of the combination of the server ID and the OS, on a basis of the combination of the server name and the OS, on a basis of the combination of the name, frequency, and count of CPUs and the memory size, or the like, to thereby generate a plurality of decision trees.

That is, the rule generating unit 302 generates one or more decision trees in accordance with the target attribute and the class that are set by the administrator in terms of the predetermined structure condition, to thereby generate sorting rules expressed by a plurality of IF-THEN rules.

For example, by tracking the branches of the decision tree 6, which is generated by the rule generating unit 302 in terms of the predetermined structure information, on the outermost left side (on the left side of FIG. 8) from the root to the leaf, such an IF-THEN rule is indicated that the processor activity ratio in terms of the predetermined structure condition set by the administrator is less than 70% (class: 0-70) in a case where the number of simultaneously connected users is 42 or less, the disk usage ratio is 5.50% or less, and the used memory size is 200 MBytes or less.

Numerical values within parentheses appended to each leaf indicate a total number of performance information items to be sorted and the number of erroneously sorted items.

For example, "(400/20)" appended to class: 0-70 of the leaf on the outermost left side indicates that the total number of performance information items to be sorted which have been sorted as the items on the outermost left side is 400, and the 400 items contains 20 erroneously sorted performance information items that have the processor activity ratio larger than 70% (other than class: 0-70).

Next, description will be made of an operation in a case where the network system 1 performs the structure management and the performance management.

Figure 9:
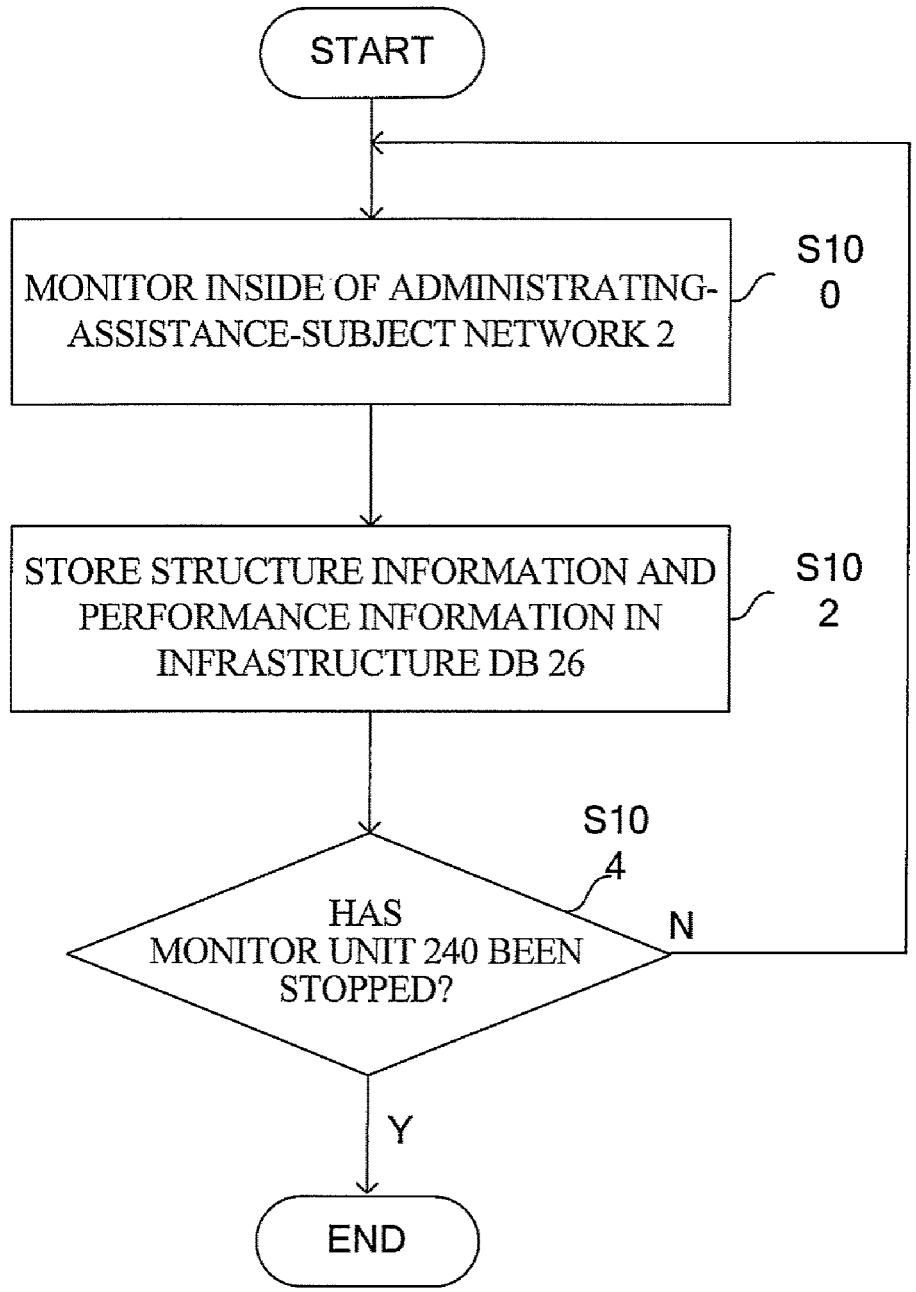
FIG. 9 is a flowchart showing an operation (S10) of an administrating server.

FIG. 9 is a flowchart showing an operation (S10) of the administrating server 24.

As shown in FIG. 9, in Step 100 (S100), the administrating server 24 causes the monitor unit 240 to acquire the structure information and performance information of its own and the servers 222-1 to 222-m, and monitors the inside of the administrating-assistance-subject network 2.

In Step 102 (S102), the administrating server 24 stores the structure information 260 and the performance information 264 in the infrastructure DB 26 at predetermined intervals that are respectively set by the administrator.

Note that if there is no change in the structure information 260, the administrating server 24 stores only the performance information 264 in the infrastructure DB 26.

In Step 104 (S104), the administrating server 24 terminates the processing if there is an instruction to stop the monitor unit 240, for example, to turn off its power, and otherwise the procedure advances to the processing of Step S100.

Thus, the monitor unit 240 stays resident as a process on the administrating server 24 at an operating time, and monitors the inside of the administrating-assistance-subject network 2.

Figure 10:
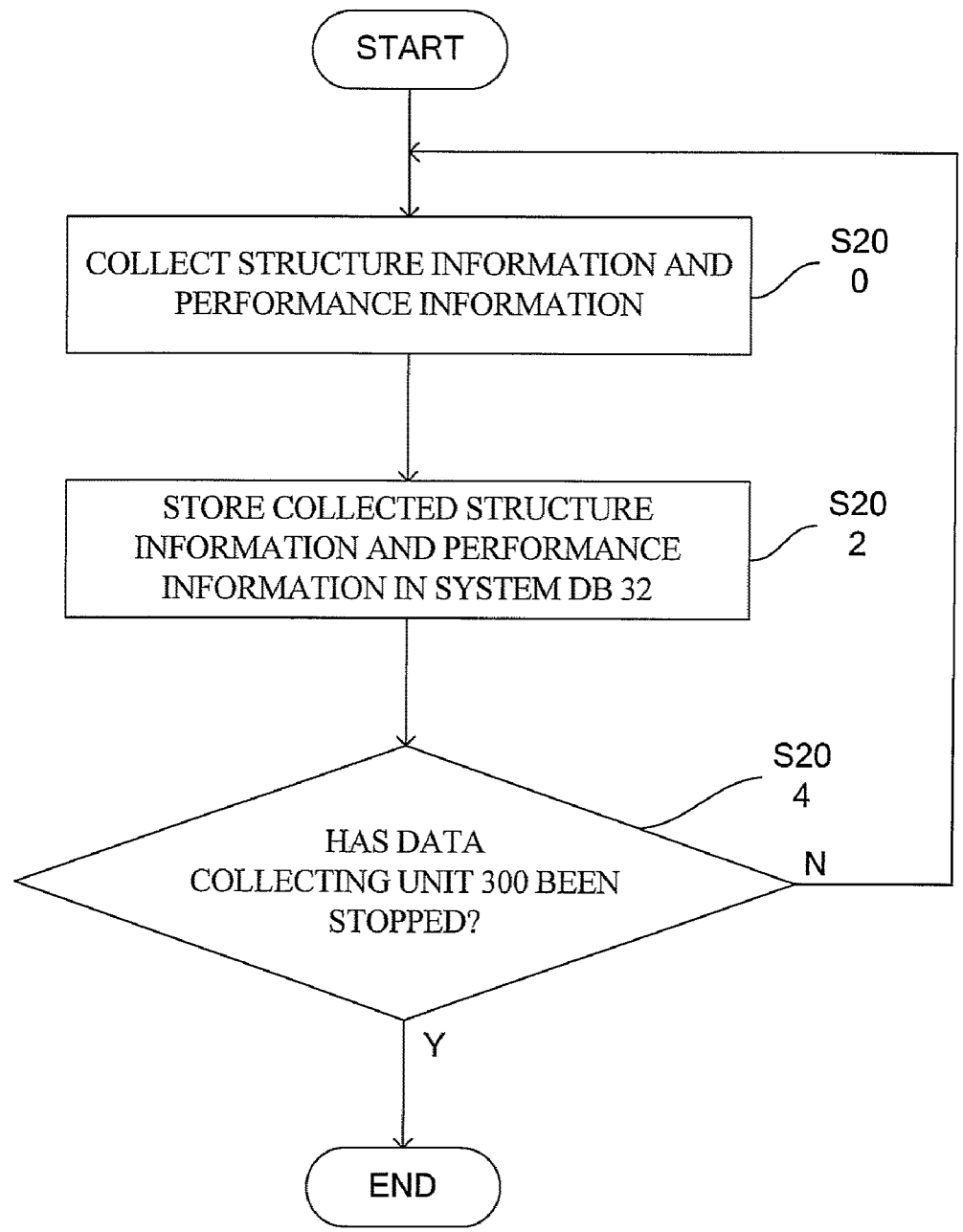
FIG. 10 is a flowchart showing an operation (S20) of a data collecting unit.

FIG. 10 is a flowchart showing an operation (S20) of the data collecting unit 300.

As show in FIG. 10, in Step 200 (S200), the data collecting unit 300 collects the structure information 260 and the performance information 264 from the respective infrastructure DBs 26 of the administrating-assistance-subject networks 2-1 to 2-n according to the settings made by the administrator.

However, the data collecting unit 300 is configured so as not to collect the already collected structure information 260 and performance information 264.

In Step 202 (S202), the data collecting unit 300 stores the collected structure information 260 and performance information 264 in the system DB 32 at predetermined intervals that are respectively set by the administrator.

However, the data collecting unit 300 is configured so as not to store the already stored structure information 260 and performance information 264 in the system DB 32.

In Step 204 (S204), the data collecting unit 300 terminates the processing if there is an instruction to stop the administrating-assistance server 30, for example, to turn off its power, and otherwise the procedure advances to the processing of Step S200.

Thus, the data collecting unit 300 operates while staying resident as a process on the administrating-assistance server 30 at an operating time.

Figure 11:
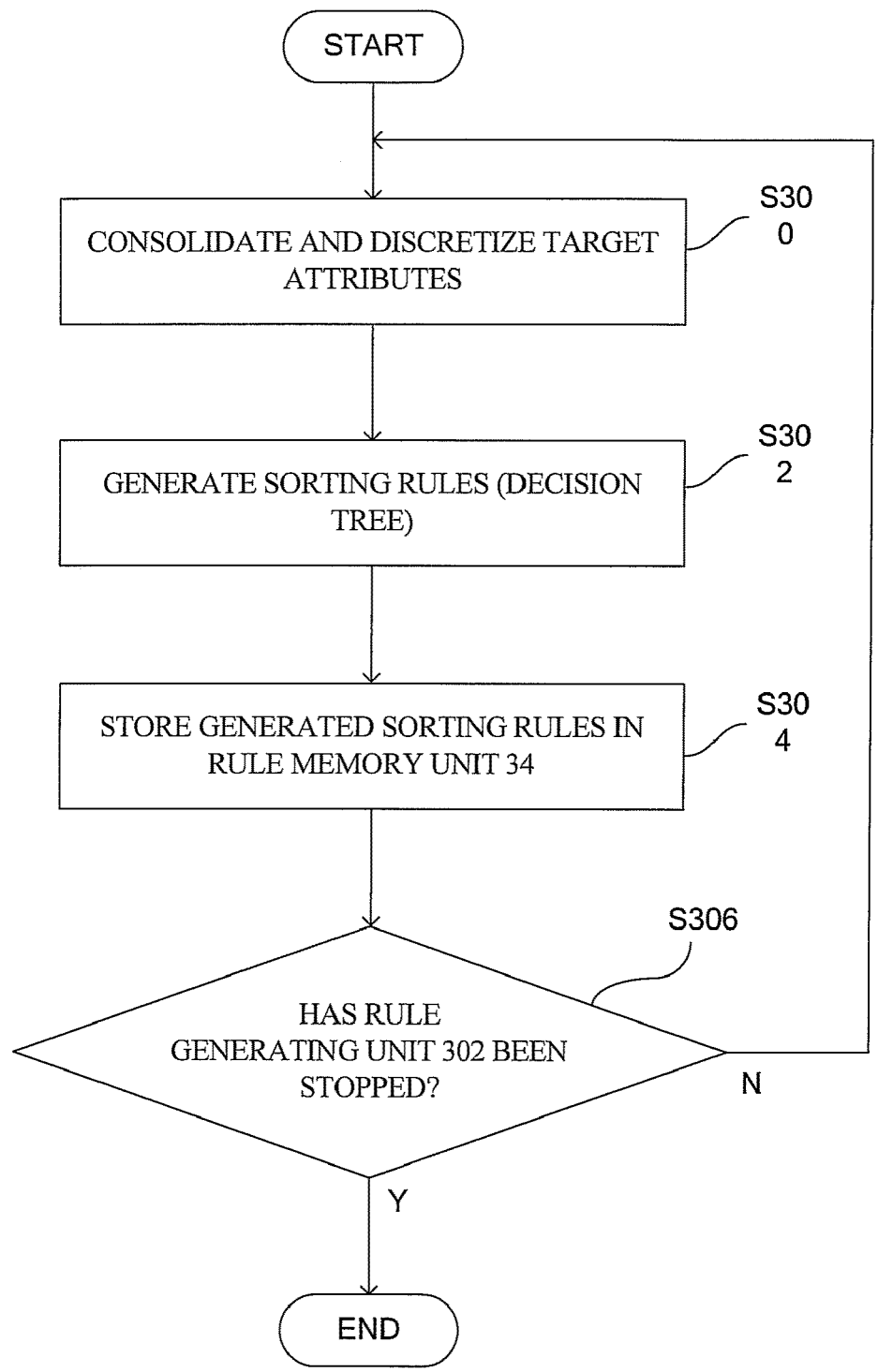
FIG. 11 is a flowchart showing an operation (S30) of the rule generating unit.

FIG. 11 is a flowchart showing an operation (S30) of the rule generating unit 302.

As shown in FIG. 11, in Step 300 (S300), the rule generating unit 302 acquires the structure information 320 and the performance information 324 that are stored in the system DB 32, consolidates the performance information 324 items in accordance with the predetermined structure condition (on a server ID basis or the like) at predetermined intervals set by the administrator, and discretizes the target attributes.

In Step 302 (S302), the rule generating unit 302 generates sorting rules (a decision tree) from the discretized performance information 324.

In Step 304 (S304), the rule generating unit 302 stores the generated sorting rules (decision tree) in the rule memory unit 34.

In Step 306 (S306), the rule generating unit 302 terminates the processing if there is an instruction to stop the administrating-assistance server 30, for example, to turn off its power, and otherwise the procedure advances to the processing of Step S300.

Thus, the rule generating unit 302 operates while staying resident as a process on the administrating-assistance server 30 at an operating time.

However, in a case where there is no update in the system DB 32, the rule generating unit 302 stays without performing any operation.

Figure 12:
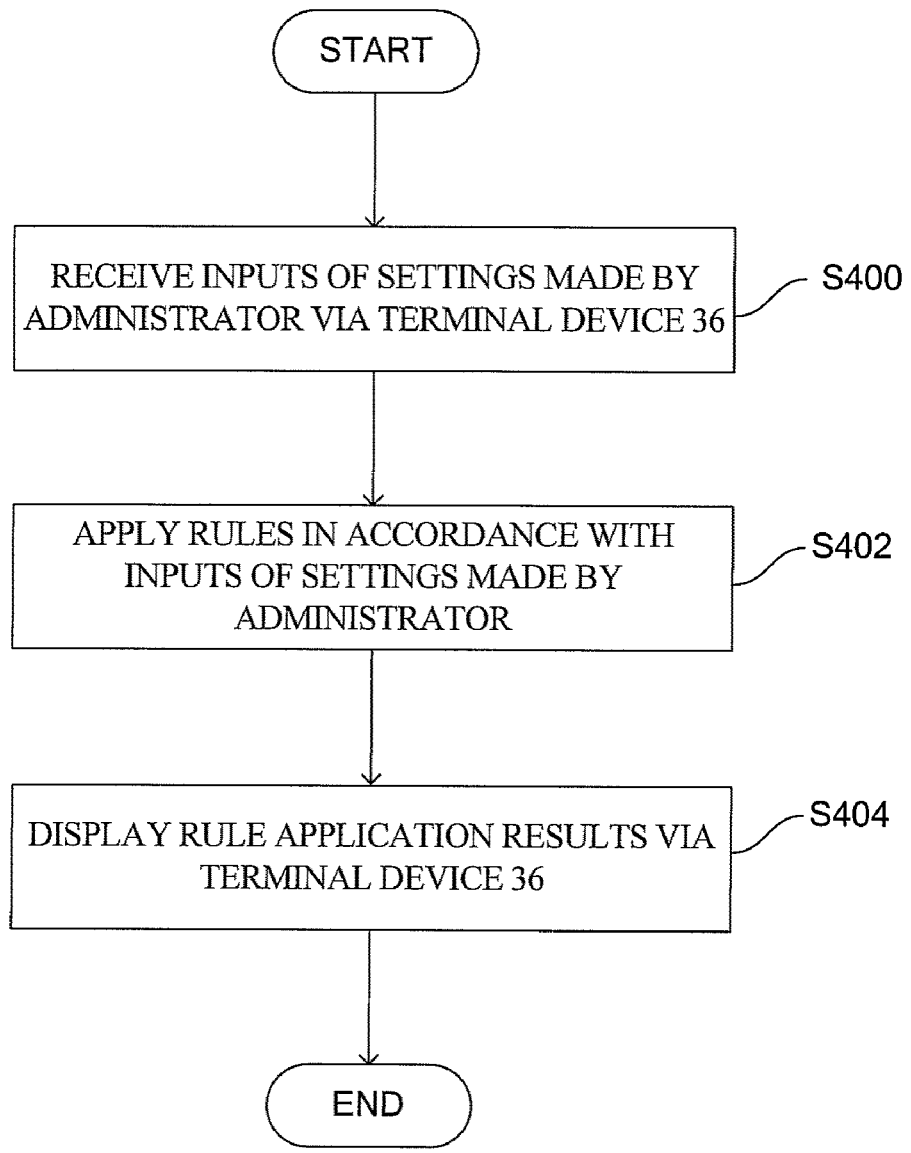
FIG. 12 is a flowchart showing an operation (S40) of an information extracting unit.

FIG. 12 is a flowchart showing an operation (S40) of the information extracting unit 304.

As shown in FIG. 12, in Step 400 (S400), the information extracting unit 304 receives inputs of settings made by the administrator via the terminal device 36.

In Step 402 (S402), the information extracting unit 304 performs a processing of applying the sorting rules in accordance with the inputs of settings made by the administrator.

For example, in accordance with the inputs of settings made by the administrator, the information extracting unit 304 extracts from the rule memory unit 34 the structure information on the other server 222 which satisfies necessary performance conditions for at least any one of the servers 222 at an operating time, the performance information to be a bottleneck against the necessary performance conditions for at least any one of the servers 222 at an operating time, or other such information.

In Step 404 (S404), the information extracting unit 304 displays results obtained by applying the rules in the processing of Step S402 through the intermediation of the console of the terminal device 36.

First Embodiment

Next, description will be made of a first embodiment of the structure management and the performance management performed in the network system 1.

Figure 13:
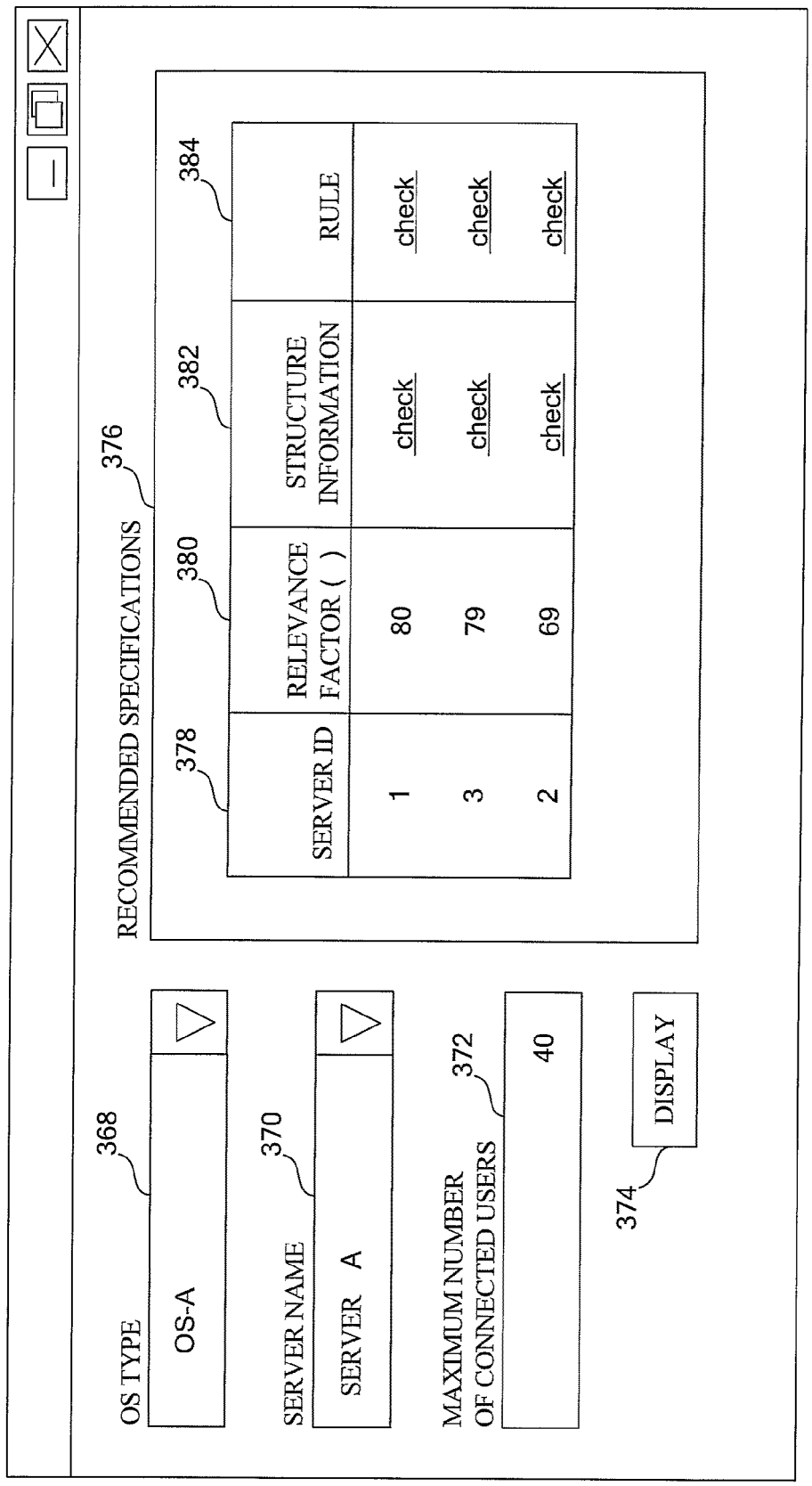
FIG. 13 is a first screen that is displayed on a UI device when the administrator manipulates a terminal device in terms of operations of the network system.

FIG. 13 is a first screen 364 that is displayed on a UI device 362 when the administrator manipulates the terminal device 36 in terms of operations of the network system 1.

The first screen 364 has an OS type selection field 368, a server name selection field 370, a maximum number-of-connected users input field 372, a display instruction button 374, and a recommended specifications display field 376.

Note that in the first embodiment, the first screen 364 is, for example, a screen provided to display information related to the servers 222 that are operating in a preferable state in terms of the preset performance condition that the processor activity ratio is less than 70%, and the decision trees are generated in accordance with the performance information acquired at predetermined intervals on a server ID basis.

The OS type selection field 368 is configured to, for example, display types of OS having an SNMP agent function and installed in the servers 222 and the administrating server 24 as a drop-down list, and allow the administrator to select an OS type.

The server name selection field 370 is configured to, for example, display server names for identifying model names of the servers 222 and the administrating server 24 as a drop-down list, and allow the administrator to select a model name.

The maximum number-of-connected users input field 372 is configured to, for example, allow the administrator to directly input as the performance condition the maximum number of connected users expected with respect to the servers 222 for which the administrator specifies the structure conditions through the OS type selection field 368 and the server name selection field 370.

The display instruction button 374 is an instruction button for displaying in the recommended specifications display field 376 information related to the servers 222 which satisfy the structure condition selected by the administrator and the performance condition inputted by the administrator, and which satisfy the preset performance condition that the processor activity ratio is less than 70% (or which are operating in a preferable state).

The recommended specifications display field 376 has a server ID display field 378, a relevance factor display field 380, a structure information selection field 382, and a rule selection field 384, and is configured to display the information related to the servers 222 which satisfy the conditions specified through the intermediation of the display instruction button 374 (or which are operating in a preferable state) for each server ID.

The server ID display field 378, for example, displays the server IDs of the servers 222 which match the conditions specified through the intermediation of the display instruction button 374 (or which are operating in a preferable state) in descending order of relevance factor with respect to the rules applied by the information extracting unit 304.

The relevance factor display field 380 displays relevance factors with respect to the rules corresponding to the server IDs displayed in the server ID display field 378 in the same order of server ID as displayed in the server ID display field 378.

The structure information selection field 382 displays check marks linked to the structure information corresponding to the server IDs displayed in the server ID display field 378 in the same order of server ID as displayed in the server ID display field 378.

That is, the structure information selection field 382 is configured so that the administrator can confirm the structure information items corresponding to the displayed server IDs by selecting and clicking on the check marks in the structure information selection field 382 displayed in the order of server ID.

The rule selection field 384 displays check marks linked to the applied rules corresponding to the server IDs displayed in the server ID display field 378 in the same order of server ID as displayed in the server ID display field 378.

That is, the rule selection field 384 is configured so that the administrator can confirm the applied rules corresponding to the displayed server IDs by selecting and clicking on the check marks in the rule selection field 384 displayed in the order of server ID.

Figure 14:
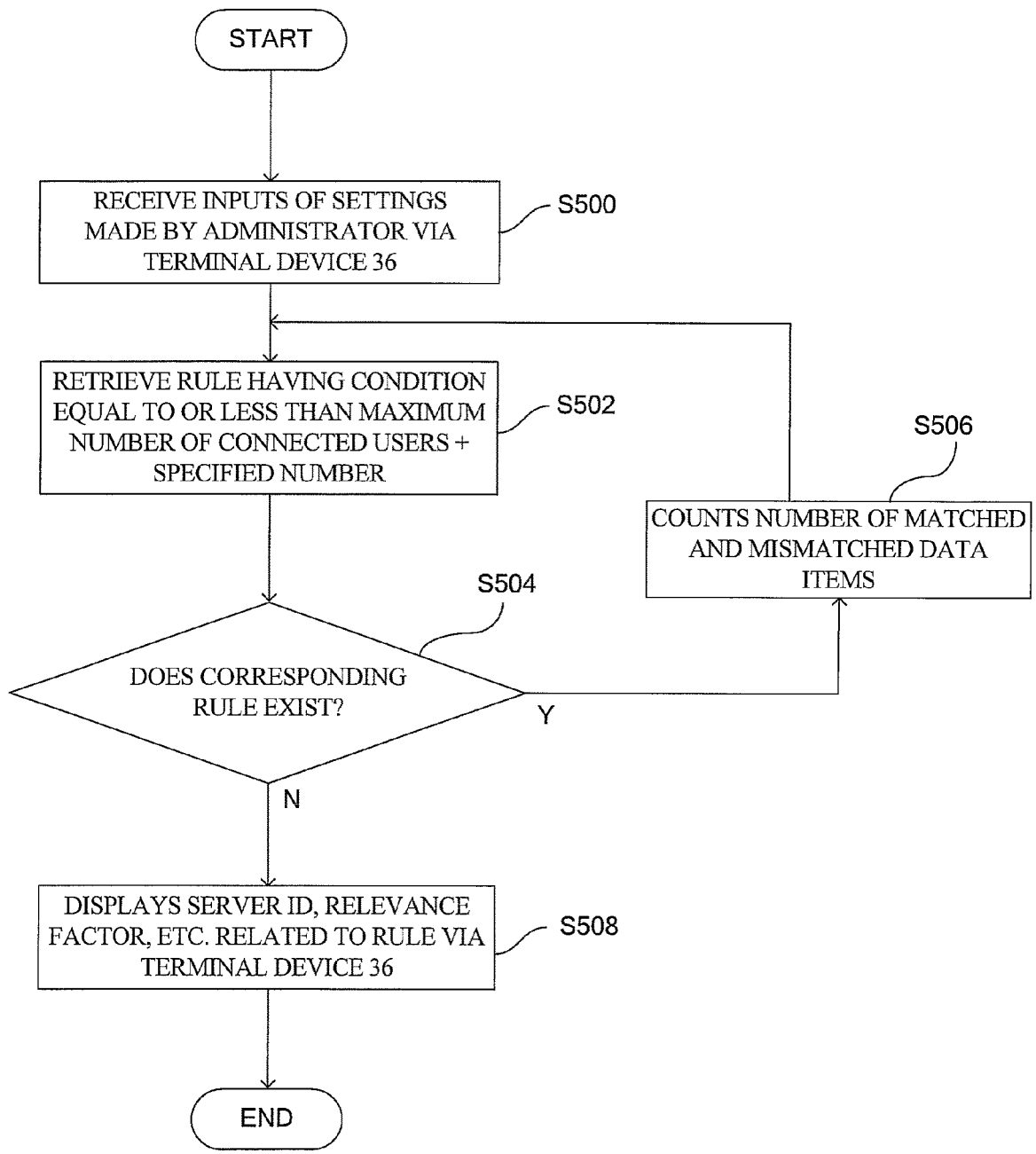
FIG. 14 is a flowchart showing a processing (S50) performed by the information extracting unit if the administrator performs manipulation with respect to the first screen shown in FIG. 13.

FIG. 14 is a flowchart showing a processing (S50) performed by the information extracting unit 304 if the administrator performs manipulation with respect to the first screen 364 shown in FIG. 13.

As shown in FIG. 14, in Step 500 (S500), the information extracting unit 304 receives inputs of settings made by the administrator via the terminal device 36.

In Step 502 (S502), the information extracting unit 304 retrieves a rule having a condition that is the same as the maximum number of connected users inputted by the administrator or that is close to the maximum number of connected users (for example, equal to or less than the maximum number of connected users plus a specified number).

In Step 504 (S504), the information extracting unit 304 judges whether or not a rule corresponding to the inputs of settings made by the administrator exists within the rule memory unit 34. If the rule exists within the rule memory unit 34, the procedure advances to the processing of Step S506, and if the rule does not exist within the rule memory unit 34, the procedure advances to the processing of Step S508.

In Step 506 (S506), the information extracting unit 304 counts the number of (matched) data items that are correctly sorted according to the rules corresponding to the inputs of settings made by the administrator and the number of (mismatched) data items that are erroneously sorted, and then the procedure advances to the processing of Step S502.

In Step 508 (S508), the information extracting unit 304 calculates the relevance factor from the results counted in the processing of Step S506, and displays the server ID, the relevance factor, and the like related to the rule corresponding to the inputs of settings made by the administrator via the terminal device 36.

Note that if the decision tree has not grown, and if the number of rules corresponding to the inputs of settings made by the administrator is zero, the information extracting unit 304 is configured to display that the number of rules corresponding to the inputs of settings made by the administrator is zero via the terminal device 36.

Second Embodiment

Next, description will be made of a second embodiment of the structure management and the performance management performed in the network system 1.

Figure 15:
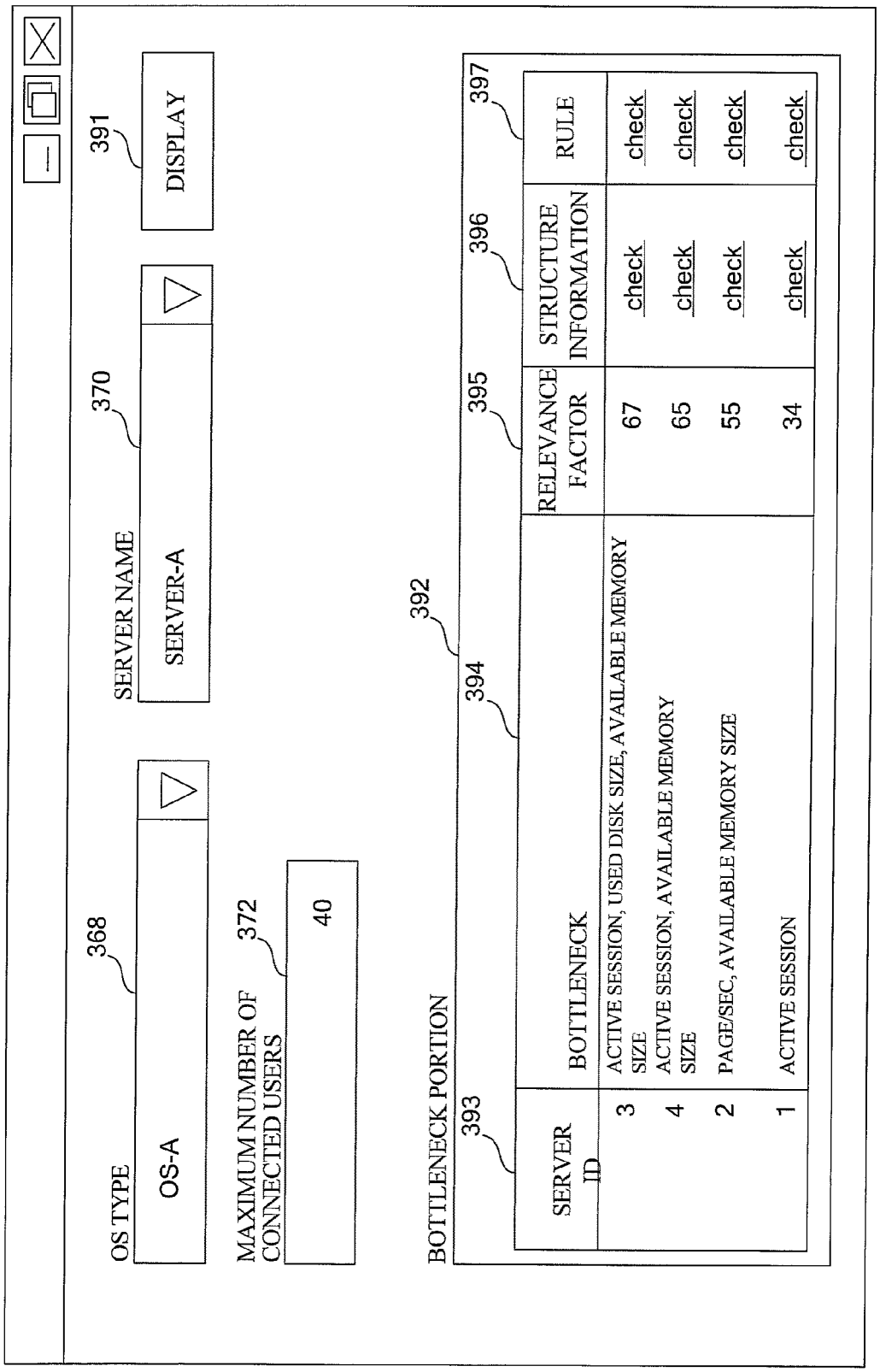
FIG. 15 is a second screen that is displayed on the UI device when the administrator manipulates the terminal device in terms of the operations of the network system.

FIG. 15 is a second screen 390 that is displayed on the UI device 362 when the administrator manipulates the terminal device 36 in terms of the operations of the network system 1.

The second screen 390 has the OS type selection field 368, the server name selection field 370, the maximum number-of-connected users input field 372, a display instruction button 391, and a bottleneck portion display field 392.

Note that in the second embodiment, the second screen 390 is, for example, a screen provided to display information related to the servers 222 that are operating in a state having a portion to be the bottleneck in terms of the preset performance condition that the processor activity ratio is less than 70%, and the decision trees are generated in accordance with the performance information acquired at predetermined intervals on a server ID basis.

Further, in the second screen 390, components on which the administrator performs substantially the same operation as on the components of the first screen 364 shown in FIG. 13 are denoted by the like reference numerals.

The display instruction button 391 is an instruction button for displaying in the bottleneck portion display field 392 information related to the servers 222 which satisfy the structure condition selected by the administrator and the performance condition inputted by the administrator, and which are operating in a state having a portion to be the bottleneck in terms of the preset performance condition that the processor activity ratio is less than 70%.

The bottleneck portion display field 392 has a server ID display field 393, a bottleneck display field 394, a relevance factor display field 395, a structure information selection field 396, and a rule selection field 397, and is configured to display the information related to the servers 222 which are operating in the state having a portion to be the bottleneck in terms of the conditions specified through the intermediation of the display instruction button 391 for each server ID.

The server ID display field 393, for example, displays the server IDs of the servers 222 which are operating in the state having a portion to be the bottleneck in terms of the conditions specified through the intermediation of the display instruction button 391 in descending order of relevance factor with respect to the rules applied by the information extracting unit 304.

The bottleneck display field 394 displays performance parameters to be the bottleneck of the servers 222 corresponding to the server IDs displayed in the server ID display field 393 in terms of the performance condition that the processor activity ratio is less than 70%, in the same order of server ID as displayed in the server ID display field 393.

For example, in the decision tree 6 shown in FIG. 8, the node 610 has the leaf of class: 70-100 as a conclusion part in a branch corresponding to the binarized result, so the information extracting unit 304 can set the page/sec indicating the number of transferred pages per second as a candidate of the performance parameter to be the bottleneck.

The relevance factor display field 395 displays relevance factors with respect to the rules corresponding to the server IDs displayed in the server ID display field 393 in the same order of server ID as displayed in the server ID display field 393.

The structure information selection field 396 displays check marks linked to the structure information corresponding to the server IDs displayed in the server ID display field 393 in the same order of server ID as displayed in the server ID display field 393.

That is, the structure information selection field 396 is configured so that the administrator can confirm the structure information items corresponding to the displayed server IDs by selecting and clicking on the check marks in the structure information selection field 396 displayed in the order of server ID.

The rule selection field 397 displays check marks linked to the applied rules corresponding to the server IDs displayed in the server ID display field 393 in the same order of server ID as displayed in the server ID display field 393.

That is, the rule selection field 397 is configured so that the administrator can confirm the applied rules corresponding to the displayed server IDs by selecting and clicking on the check marks in the rule selection field 397 displayed in the order of server ID.

INDUSTRIAL APPLICABILITY

The present invention can be used for a network system or the like which includes a plurality of agent nodes having an agent function and one or more manager nodes having a manager function.

What is claimed is:

1. A network system including one or more manager nodes having a manager function for performing at least structure management and operating-time performance management on a plurality of agent nodes having an agent function, comprising:
    storage means for storing structure information and operating-time performance information on each of the agent nodes;
    rule generating means for generating sorting rules for sorting the structure information stored in the storage means based on characteristic performance information at an operating time;
    extracting means for extracting structure information on another one of the agent nodes that satisfies necessary performance conditions at an operating time for at least one of the agent nodes, based on the sorting rules generated by the rule generating means, from the storage means; and
    output means for outputting the structure information extracted by the extracting means.

2. A network system according to claim 1, wherein:
    the extracting means further extracts information indicating the sorting rules being a basis for extracting the structure information on the another one of the agent nodes; and
    the output means further outputs the information indicating the sorting rules extracted by the extracting means.

3. A network system according to claim 2, further comprising structure information input means for receiving an input indicating the structure information corresponding to at least one of the agent nodes,
    wherein the extracting means extracts information corresponding to the input received by the structure information input means from the storage means.

4. A network system according to claim 3, further comprising performance condition input means for receiving an input indicating the necessary performance conditions at an operating time for at least one of the agent nodes,
    wherein the extracting means extracts information corresponding to the input received by the performance condition input means from the storage means.

5. A network system according to claim 4, wherein the rule generating means generates the sorting rules while learning.

6. A network administrating device, which is used for a network system including one or more manager nodes having a manager function for performing at least structure management and operating-time performance management on a plurality of agent nodes having an agent function, comprising:
    storage means for storing structure information and operating-time performance information on each of the agent nodes;
    rule generating means for generating sorting rules for sorting the structure information stored in the storage means based on characteristic performance information at an operating time;
    extracting means for extracting performance information to be a bottleneck in terms of necessary performance conditions at an operating time for at least one of the agent nodes, based on the sorting rules generated by the rule generating means, from the storage means for each of the agent nodes; and
    output means for outputting the performance information extracted by the extracting means.

7. A network administrating device according to claim 6, wherein:
    the extracting means further extracts information indicating the sorting rules being a basis for extracting the performance information to be the bottleneck for each of the agent nodes; and the output means further outputs the information indicating the sorting rules extracting means.

8. A method of administrating networks each of which includes one or more manager nodes having a manager function for performing at least structure management and operating-time performance management on a plurality of agent nodes having an agent function, comprising:

storing structure information and operating-time performance information on each of the agent nodes in storage means;

generating sorting rules for sorting the stored structure information based on characteristic performance information at an operating time;

extracting structure information on another one of the agent nodes that satisfies necessary performance conditions at an operating time for at least one of the agent nodes, based on the generated sorting rules, from the storage means; and outputting the extracted structure information.

9. A method of administrating networks each of which includes one or more manager nodes having a manager function for performing at least structure management and operating-time performance management on a plurality of agent nodes having an agent function, comprising:

storing structure information and operating-time performance information on each of the agent nodes in storage means;

generating sorting rules for sorting the stored structure information based on characteristic performance information at an operating time;

extracting performance information to be a bottleneck in terms of necessary performance conditions at an operating time for at least one of the agent nodes, based on the generated sorting rules, from the storage means for each of the agent nodes; and outputting the extracted performance information.

10. A system comprising:
an administrative server system comprising:
a first processor unit;
a first memory unit to the first processor unit; and
a first network interface card coupled to the first processor unit;
the first memory unit stores software that, when executed by the processor unit, causes the processor unit to:
collect from a plurality of intermediate computer systems, distinct from the administrative server system, information regarding performance for a plurality of agent nodes, distinct from both the administrative server system and the plurality of intermediate computer systems;
extract from the information the identity of at least one agent node whose performance meets a selected rule; and
display on an input/output device the identity of the at least one agent node.

11. The system as in claim 10 wherein when the first processor unit collects information regarding performance, the software further causes the first processor unit to collect information regarding processor performance of each agent node.

12. The system as in claim 11 wherein when the first processor unit collects the information regarding processor performance of each agent node, the software further causes the first processor unit to collect at least one selected from the group consisting of: average processor activity ratio; maximum processor activity ratio; processor busy ratio; context switch count per unit time; and interrupt count per unit time.

13. The system as in claim 10 wherein when the first processor unit collects information regarding performance, the software further causes the first processor unit to collect information regarding memory performance of each agent node.

14. The system as in claim 13 wherein when the first processor unit collects the information regarding memory performance of each agent node, the software further causes the first processor unit to collect at least one selected from the group consisting of: the number of read pages per unit time; page input count per unit time; and page fault count per unit time.

15. The system as in claim 10 wherein when the first processor unit collects information regarding performance, the software further causes the first processor unit to collect information regarding network interface card performance of each agent node.

16. The system as in claim 15 wherein when the first processor unit collects the information regarding network interface card performance of each agent node, the software further causes the first processor unit to collect at least one selected from the group consisting of: network transfer amount per unit time; transmission amount per unit time; and reception amount per unit time.

17. The system as in claim 10 wherein when the processor unit collects information regarding performance, the software further causes the processor unit to collect information regarding storage system performance of each agent node.

18. The system as in claim 17 wherein when the processor unit collects the information regarding storage system performance of each agent node, the software further causes the processor unit to collect at least one selected from the group consisting of: storage transfer count per unit time; and storage transfer amount per unit time.

19. The system as in claim 10 further comprising:
an intermediate computer of the plurality of intermediate computer systems, the intermediate computer system comprising:
a second processor unit;
a second memory unit to the second processor unit; and
a second network interface card coupled to the second processor unit, and coupled to the first network interface card;
the second memory unit stores software that, when executed by the second processor unit, causes the processor unit to:
collect from the plurality of agent nodes the information regarding performance; and
store the information in a database coupled to the intermediate computer system;
wherein when the first processor unit collects information regarding performance, the software further causes the first processor unit to collect, at least in part, from the intermediate computer system.

* * * * *

UNITED STATES PATENT AND TRADEMARK OFFICE
CERTIFICATE OF CORRECTION

| | |
|---|---|
| PATENT NO. | : 8,359,378 B2 |
| APPLICATION NO. | : 12/094740 |
| DATED | : January 22, 2013 |
| INVENTOR(S) | : Yoshimitsu Kudo |

It is certified that error appears in the above-identified patent and that said Letters Patent is hereby corrected as shown below:

In the Claims

In column 15, line 2, in Claim 7, delete "sorting rules extracting means." and insert
-- sorting rules extracted by the extracting means. --, therefor.

Signed and Sealed this
Twenty-first Day of May, 2013

Teresa Stanek Rea
*Acting Director of the United States Patent and Trademark Office*